Dec. 8, 1970  R. C. WILLIAMS  3,545,108
COMBINATION LOADING AND TRACTION DEVICE FOR SCRAPER
Filed July 19, 1968  2 Sheets-Sheet 1

INVENTOR.
Russell C. Williams
BY
E. J. Biskup
ATTORNEY

INVENTOR.
Russell C. Williams
BY
C. J. Biskup
ATTORNEY

United States Patent Office 3,545,108
Patented Dec. 8, 1970

3,545,108
COMBINATION LOADING AND TRACTION DEVICE FOR SCRAPER
Russell C. Williams, Rocky River, Ohio, assignor to General Motors Corporation, Detroit, Mich., a corporation of Delaware
Filed July 19, 1968, Ser. No. 746,155
Int. Cl. B60p 1/36
U.S. Cl. 37—8                                    5 Claims

ABSTRACT OF THE DISCLOSURE

A combination loading and traction device supported within a scraper bowl having an open front defined by a pair of laterally spaced side walls and a transverse cutting blade extending between the side walls. The loading and traction device takes the form of a conveyor and is mounted between the side walls and has an endless track, the lower portion of which is adapted to engage the ground to serve as a traction means for driving the scraper. The track extends transversely across the open front of the bowl and has a rear portion leading upwardly for assisting the loading of the bowl during a digging operation.

---

Self-loading scarpers of the type that employ an auxiliary loading device are becoming very popular for earth-moving operations because of their capability to quickly load an increased amount of material into the bowl without the aid of pusher tractors. As a result, an increased amount of interest has been shown in this form of scraper and various proposals have been made as to the type of device which can be utilized for facilitating the loading of the scraper bowl.

One form of scraper loading device which has gained wide acceptance is the so-called "conveyor" or "elevator" device which consists of an endless chain entrained about vertically spaced sprocket wheels rotatably mounted on the opposite ends of a suspended frame. The chain has a plurality of transversely extending flights which serve to propel material into the bowl during a scraper digging operation. This type of loader has certain advantages in that the elevating flights break up and pulverize the material as it is being carried into the bowl and also serve to pick up the cut material from the scraper blade and raise it toward the rear of the bowl so as to provide a heaped load. As a consequence, the tractive power of the scraper does not have to be utilized for forcing newly cut material against the material already in the bowl to gain entrance therein. This relieves the driven wheels from an appreciable amount of the tractive effort required for loading the bowl so that less wear and prolonged life of the rubber tires is realized. So long as the scraper operates in dry and soft or sandy soil, the aforementioned advantage is realized; however, under conditions where the soil is wet or takes the form of clay, the loading efficiency drops off significantly and the self-loading ability of the scraper is impaired. Accordingly, there is a need for a loading device which will be effective to push material into the bowl when the scraper is operating in a wide range of materials.

The present invention is intended to fill the need mentioned above by providing an elevating or conveyor device for a scraper that functions to propel material to the rear of the scraper bowl and also serves as a traction means to drive the scraper and substantially relieve the rubber tires from this function. This is accomplished by having a combination loading and traction device consisting of an endless track which in the preferred form extends transversely across sunbstantially the full width of the bowl and is entrained about an elevated drive sprocket and a pair of horizontally spaced sprocket wheels located below the drive sprocket and forwardly of the scraper's cutting blade. Thus, the lower section of the track between the sprocket wheels provides a flat ground-engaging section with a plurality of grouser-like flights which are intended to drive and support the scraper during a digging operation. The loading and traction device is suspended as a unit between an upper portion of the side walls and can be pivotally adjusted so as to control the depth of cut and the extent of engagement between the ground and track.

The principal objects of the present invention are to provide a self-loading scraper having an auxiliary loading device which also serves as a traction means; to provide a load-assist device for a scraper bowl which is pivotally supported between the side walls of the bowl and has a track type conveyor chain provided with grouser-like flights which will engage the ground forwardly of the cutting blade and provide tractive effort; and to provide a scraper bowl having an elevating type conveyor located at its open end forwardly of the cutting blade and having horizontally spaced sprocket wheels between which a substantially flat section of tracks shoes having grousers move in a rearward direction and the track section being adapted to be placed into engagement with the ground so as to act as a support for the scraper and a drive means therefor.

A better understanding of the invention can be obtained from the following detailed description when read with reference to the drawings in which.

Figure 1:
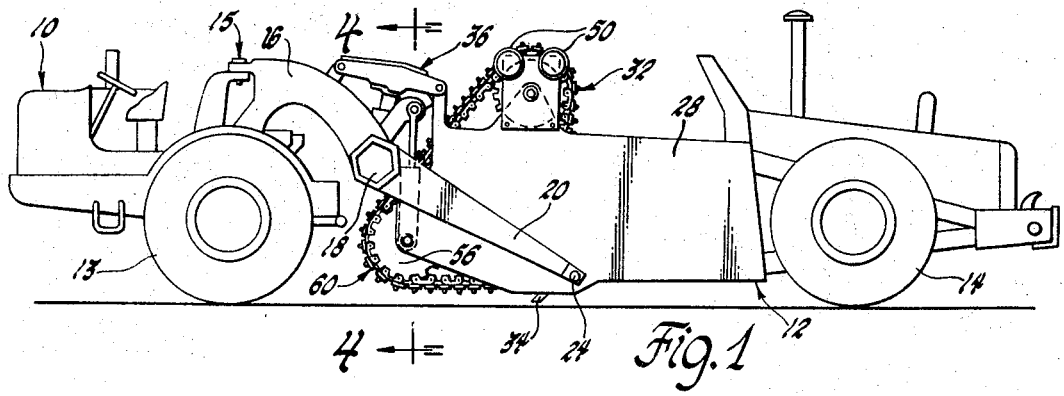
FIG. 1 shows a rubber-tired overhung scraper incorporating a combination loading and traction device made in accordance with the invention.
Figure 3:
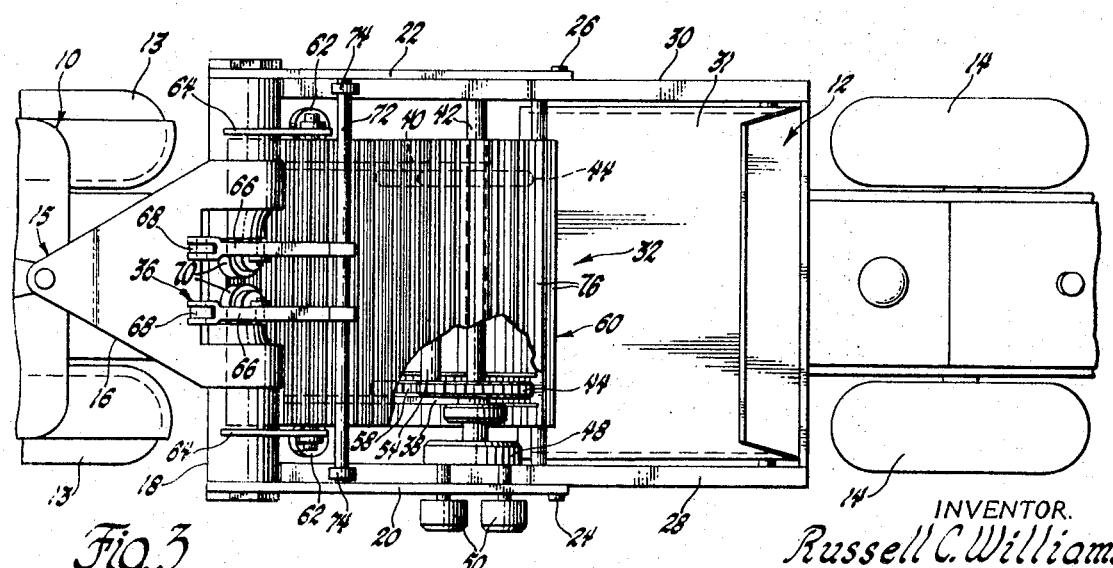
FIG. 3 is a plan view of the scraper shown in FIG. 2.

Referring to the drawings and specifically FIG. 1 thereof, a scraper is shown having the usual overhung tractor 10 and trailing scraper bowl 12 which are supported in the usual manner by rubber tires 13 and 14, respectively. The tractor 10 is connected through a universal coupling 15 to a pull yoke including a gooseneck 16 which extends rearwardly for rigid connection with a transverse torque tube 18. As seen in FIG. 3, the opposite ends of the torque tube 18 are provided with pull arms 20 and 22, the lower ends of which are connected by transversely aligned pivot connections 24 and 26 to side walls 28 and 30 of the scraper bowl 12 which has an ejector 31. A combination conveyor loading and traction device 32 made according to the invention is located within the bowl 12 forwardly of the usual cutting blade 34 and serves as a means for assisting loading of material into the bowl as well as a drive means which relieves the scraper tires from functioning as the sole means for propelling the scraper. As is conventional with scrapers of this type, the front end of the bowl 12 is supported by a bowl control mechanism 36 mounted on the torque tube 18. The control mechanism 36 serves to move the bowl 12 between the raised-carry position of FIG. 1 and a lowered-dig position in a manner to be described.

Figure 2:
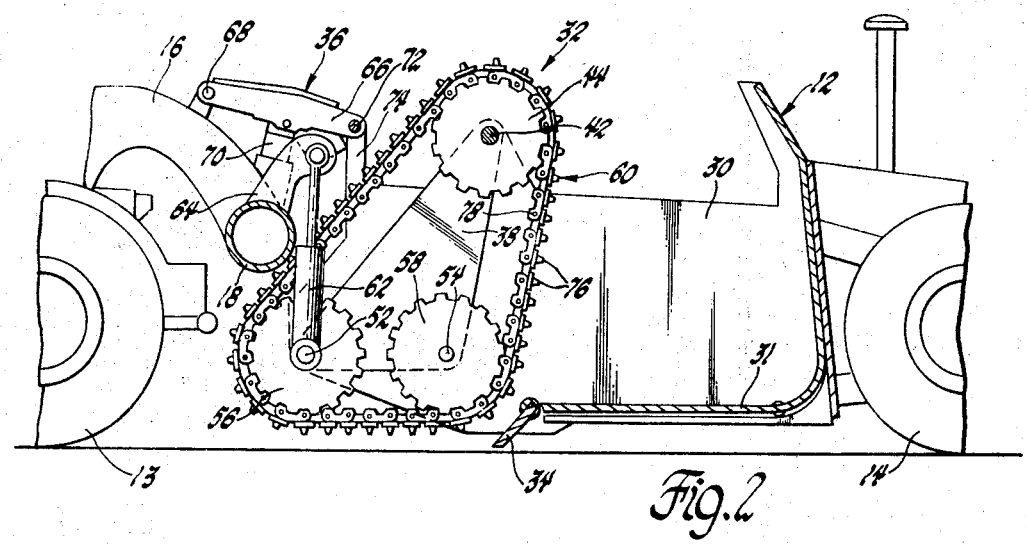
FIG. 2 is an enlarged view of the scraper of FIG. 1 with portions removed so as to show the details of construction of the loading and traction device.
Figure 4:
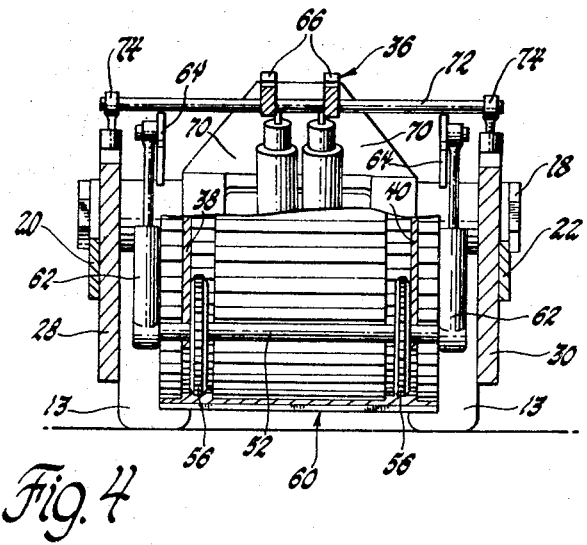
FIG. 4 is a view taken on line 4—4 of FIG. 1.

As seen in FIGS. 2, 3 and 4, the conveyor or loading and traction device 32 comprises a pair of laterally spaced and triangularly-shaped support frame members 38 and 40, each of which has the upper end supported for pivotal movement by a transverse drive shaft 42 extending between the side walls 28 and 30. The drive shaft 42 rigidly supports a pair of spaced drive sprockets 44 and has one end rotatably mounted in the side wall 30 while the other end of the drive shaft is connected through a suitable gear box 48 to hydraulic motors 50 suitably supported by the side wall 28. The hydraulic motors 50 serve to rotatably drive the drive sprockets 44 in a counterclockwise direction as seen in FIG. 2 and are driven by pressurized hydraulic fluid supplied by an engine driven pump (not shown).

The lower ends of the support frame members 38 and 40 support a pair of horizontally spaced transverse shafts 52 and 54, which respectively rotatably support sprocket wheels 56 and 58 engageable with the links of an endless track 60 entrained about the latter-mentioned sprocket wheels and the drive sprocket 44. A pair of double-acting hydraulic cylinders 62 straddle the track 60 and each has the cylinder portion thereof pivotally connected to the shaft 52 and the rod portion thereof pivotally mounted to a support bracket 64 rigid with the torque tube 18. Thus, by expansion or contraction of the hydraulic cylinders 62, the loading and traction device 32 is adjustable in position about the drive shaft 42 relative to the scraper cutting blade 34.

As seen in FIGS. 2 and 3, the bowl control mechanism 36 comprises a pair of levers 66, each of which has the forward end pivotally connected to the gooseneck 16 by a pivot connection 68. An intermediate portion of each lever 66 is pivotally connected with a hydraulic cylinder 70, the lower end of which is mounted on the torque tube 18. The rear end of each lever 66 is pivotally connected to a cross bar 72, the opposite ends of which are connected to the bowl 12 through extensions 74 fixed with the side walls. Thus, by uniform expansion of the hydraulic cylinders 70, the levers 66 rotate in a counterclockwise direction about the pivotal connections 68 and serve to move the bowl 12 and the associated loading and traction device 32 to a raised-carry position shown in FIG. 2. During such time, the hydraulic cylinders 62 are placed in a float position so as to permit such movement. Conversely, when the hydraulic cylinders 70 are contracted, the bowl 12 and the associated loading and traction device 32 can be lowered to a dig position.

At this juncture, it should be noted that the track 60 is composed of a plurality of elongated track shoes 76 attached to pivotally interconnected links 78 of the type normally found with a crawler tractor. Each track shoe 76 has a grouser which extends the length of the shoe and has sufficient depth so it can serve both as a means for propelling cut material into the bowl 12 and as a reaction surface when embedded in the ground. As should be apparent, the links 78 cooperate with the teeth formed on the drive sprockets 44 and sprocket wheels 56 and 58 for driving the track in a manner well known in this art and therefore further description of such details is not deemed necessary.

The invention as described above operates as follows:

During a digging operation the hydraulic cylinders 70 are contracted so that the cutting blade 34 engages the ground at the desired length. Thereafter, the hydraulic cylinders 62 are expanded causing the loading and traction device 32 to pivot counterclockwise, as seen in FIG. 2 about shaft 42 to force the lower section of the track 60 between the sprocket wheels 56 and 58 into engagement with the ground. As a result of the down pressure applied by the cylinders 62 on the bowl 12, substantially all of the weight on the tires 13 of the tractor 10 will be relieved and transferred to the loading and traction device 32. In order to maintain steerability, however, the down pressure on the bowl 12 should not exceed an amount which would cause the tractor tires 13 to lose complete ground contact.

Figure 5:
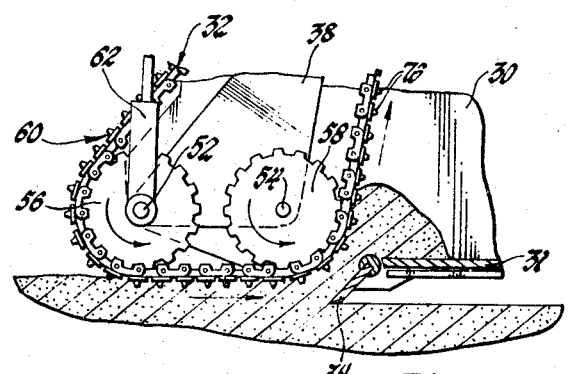
FIG. 5 shows the loading and traction device engaging the ground during a digging operation.

The hydraulic motors 50 are then activated causing a counterclockwise rotation of the drive sprockets 44 and the endless track 60 as seen in FIG. 5. The loading and traction device 32 then serves as the principal drive means of the scraper and causes the cut material to flow between the track 60 and the cutting blade 34 into the bowl 12. As the bowl 12 becomes filled, the grousers of the track shoes 76 along the track section between the drive sprocket 44 and sprocket wheel 58 serve as an elevating device for heaping material within the bowl.

When the bowl 12 has been completely filled, the hydraulic cylinders 70 are expanded and the hydraulic cylinders 62 are simultaneously placed in a float position thereby causing the bowl 12 to be raised to the carry position of FIG. 2. The scraper tires 13 then reassume their normal driving role and the load is transported to a dump location at which time the ejector 31 located within the bowl 12 can be rotated rearwardly in a well known manner to drop the load by gravity. As should be apparent, various forms of ejectors can be utilized, one of which can be seen in copending patent application Ser. No. 562,583, entitled "Ejector for Scraper Bowl," which was filed on July 5, 1966, and is assigned to the assignee of this invention.

Figure 6:
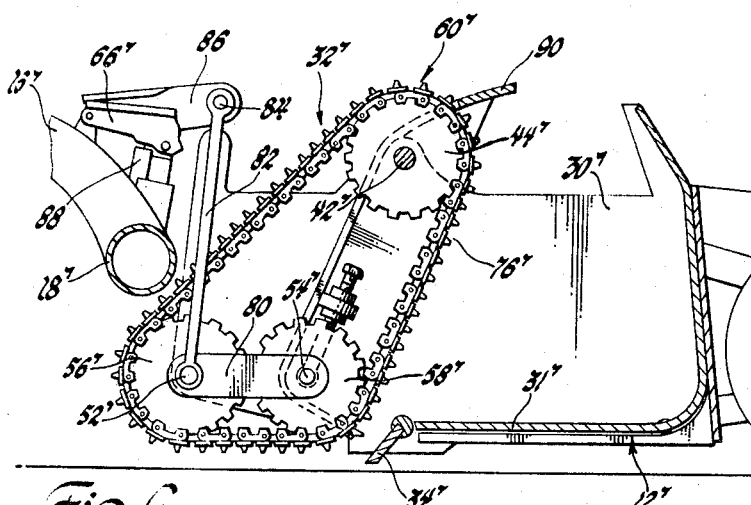
FIG. 6 shows a modified form of the loading device of FIGS. 1 through 5.

FIG. 6 of the drawings shows another form of a conveyor or loading and tractive device 32' which is basically the same as that disclosed in FIGS. 1 through 6 and, accordingly, parts thereof corresponding to the parts found in the aforesaid device have been identified by the same numerals but primed. One major difference in this arrangement is that both shafts 42' and 54' are rotatably supported by the side walls 28' and 30'. The shaft 52' and the associated sprocket wheels 56', however, are pivotally mounted to the front ends of a pair of laterally spaced support bars 80, the rear ends of which are pivotally connected to the shaft 54'. Thus, the sprocket wheels 56' are capable of being adjusted in position along an arc having the shaft 54' as its center. In this regard, it will be noted that such adjustment is realized through a link 82, the lower end of which is pivotally connected to the shaft 52'. The upper end of the link 82 is pivotally connected to a cross bar 84 which has an intermediate portion thereof pivotally mounted to a lever 86 supported in a similar manner as the levers 66' and located between the latter. A double-acting hydraulic cylinder 88 is connected to an intermediate portion of lever 86 and serves to raise and lower the link 82 upon expansion and contraction, respectively.

As should be apparent from the above, adjustment of the position of the sprocket wheels 56' in a clockwise direction about shaft 54' will result in a small portion of the lower section of the track 60' being in engagement with the ground when the scraper bowl 12' is in a lowered dig position. Conversely, when the sprocket wheel 56' is rotated in a counterclockwise direction, a larger portion of the lower track section will be in ground contact and a substantial amount of the weight of the bowl and contents is transferred from the tractor tires to the device 32' as described above in connection with the device 32 of FIGS. 1 through 5.

It will also be noted that a transverse plate 90 is attached to the side walls of the scraper and serves as a deflector running across and above the bowl 12' and to the rear of the track 60'. Thus, as the track 60' rotates about the drive sprocket 44' and the sprocket wheels 56' and 58', any material which might tend to be thrown by the track shoes 76' upwardly and forwardly relative to the bowl is deflected by the plate 90 and returned to the bowl.

Various changes and modifications can be made in this construction without departing from the spirit of the invention. Such changes and modifications are contemplated by the inventor and he does not wish to be limited except by the scope of the appended claims.

I claim:
1. In an earthmoving machine which includes a mobile open front material-carrying bowl, a cutting blade carried by said bowl, a loading and traction conveyor located within the bowl and adapted to move the material rearwardly into the bowl, the improvement wherein said conveyor includes a drive sprocket supported by an upper portion of said bowl for rotation about a transverse axis, a pair of horizontally spaced idler wheels located below said drive sprocket and forwardly of the cutting blade, one of said idler wheels being rotatably supported by a lower portion of said bowl, an endless track entrained about said drive sprocket and said idler wheels so as to have a substantially flat lower track section between the idler wheels for engaging the ground and serving as traction means, and means including a support bar for supporting the other of said idler wheels for movement relative to said drive sprocket and pivotal movement relative to said one of said idler wheels so as to provide adjustable positioning of said lower track section to vary the extent of said lower track section available for ground contact.

2. In an earthmoving machine which includes a mobile open front material-carrying bowl, a cutting blade carried by said bowl, a loading and traction conveyor located within the bowl adapted to move the material rearwardly into the bowl, the improvement wherein said conveyor includes a first sprocket rotatably supported by an upper portion of said bowl, second and third horizontally spaced sprockets located below the first sprocket and having their rotational axes located forwardly of the cutting blade and the rotational axis of said first sprocket, a shaft fixed to a lower portion of said bowl for rotatably supporting said second sprocket adjacent to and forwardly of said cutting blade, an endless track entrained about said first, second and third sprockets so as to have a substantially flat lower track section between the second and third sprockets for engaging the ground and serving as traction means, and means including a support bar for supporting said third sprocket for movement relative to said first sprocket and pivotal movement relative to said second sprocket so as to provide adjustable positioning of said lower track section relative to the bowl to vary the extent of said lower track section available for ground contact.

3. A self-loading scraper having a tractor connected by a pull yoke to a trailing bowl, said bowl having an open front defined by a pair of laterally spaced side walls and a transverse cutting blade extending between the side walls, an ejector located in said bowl for discharging material therefrom, and a loading and traction conveyor located between and carried by the side walls of said bowl, said conveyor comprising a drive sprocket supported by the upper portion of said side walls for rotation about a first transverse axis, a pair of horizontally spaced idler sprocket wheels having parallel rotational axes extending transversely to said scraper and located above and forwardly of the cutting blade, a shaft connected to the lower portion of said side wall for rotatably supporting one of said idler sprocket wheels, a support bar pivoted to said shaft and rotatably supporting the other of said idler sprocket wheels for movement relative to said drive sprocket and pivotal movement relative to said one of said idler sprocket wheels, an endless track entrained about the drive sprocket and the sprocket wheels and having a substantially flat lower track section between the horizontally spaced sprockets, power-operated hydraulic cylinders connected between the pull yoke and the other of said idler sprocket wheels for pivoting the support bar and adjusting the position of the lower track section relative to the bowl so as to place the lower track section into engagement with the ground whereby substantially all of the scraper weight supported by the tractor is transferred to the lower track section, and means for driving said drive sprocket whereby said lower track section serves as a traction means for propelling the scraper and for assisting loading of the cut material into the bowl.

4. The self-loading scraper of claim 3 wherein link means are provided for pivotally connecting said power-operated hydraulic cylinders with said other of said idler sprocket wheels.

5. The self-loading scraper of claim 3 wherein a deflector plate is secured to said side walls above the conveyor and the bowl to prevent cut material from being thrown forwardly by said endless track during a digging operation.

References Cited

UNITED STATES PATENTS

| | | | |
|---|---|---|---|
| 2,501,083 | 3/1950 | Owen | 37—192A |
| 2,564,486 | 8/1951 | MacDonald | 37—4UX |
| 2,651,120 | 9/1953 | Miller | 37—7 |
| 3,296,716 | 1/1967 | Rezabek et al. | 37—8 |
| 3,314,175 | 4/1967 | Petty et al. | 37—108 |

FOREIGN PATENTS

| | | | |
|---|---|---|---|
| 764,710 | 1951 | Germany | 37—45 |

ROBERT E. PULFREY, Primary Examiner

E. H. EICKHOLT, Assistant Examiner

U.S. Cl. X.R.

37—129